US005506198A

United States Patent [19]

Sato

[11] Patent Number: 5,506,198

[45] Date of Patent: Apr. 9, 1996

[54] HIGH-TEMPERATURE SUPERCONDUCTIVE CONDUCTOR WINDING

[75] Inventor: Kenichi Sato, Osaka, Japan

[73] Assignee: Sumitomo Electric Industries, Ltd., Japan

[21] Appl. No.: 301,923

[22] Filed: Sep. 6, 1994

Related U.S. Application Data

[63] Continuation-in-part of Ser. No. 37,477, Mar. 24, 1993, abandoned, which is a continuation of Ser. No. 745,580, Aug. 15, 1991, abandoned.

[30] Foreign Application Priority Data

Aug. 24, 1990 [JP] Japan .................................... 2-223481

[51] Int. Cl.$^6$ ........................................................ B32B 9/00

[52] U.S. Cl. .......................... 505/211; 505/230; 505/231; 505/236; 505/239; 505/704; 428/688; 428/689

[58] Field of Search ...................................... 505/230, 231, 505/236, 237, 239, 211, 701, 702, 703, 704; 428/688, 689, 209, 930

[56] References Cited

U.S. PATENT DOCUMENTS 3,281,737 10/1966 Swartz .................................... 335/216
3,813,764 6/1974 Tanaka et al. ............................ 29/599
4,499,443 2/1985 Materna .................................. 335/216
4,952,554 8/1990 Jin et al. ..................................... 505/1
4,977,039 12/1990 Onishi et al. ........................... 428/623
4,994,435 2/1991 Shiga et al. ................................. 505/1
5,063,200 11/1991 Okada et al. ............................... 505/1
5,064,809 11/1991 Hed ............................................ 505/1
5,168,259 12/1992 Takemura ................................ 335/216
5,173,678 12/1992 Bellows et al. .......................... 335/216

FOREIGN PATENT DOCUMENTS

0045604A3 10/1982 European Pat. Off. .
0292684A2 11/1988 European Pat. Off. .

OTHER PUBLICATIONS

Geballe, "Paths to Higher Temperature Superconductors", *Science*, vol. 259, pp. 1550–1551 (1993).

Parker (ed.), *McGraw–Hill Dictionary of Chemical Terms*, pp. 106–107, McGraw–Hill, New York.

Williams et al., "Chemical Compatibility of High–Temperature Superconductors with Other Materials", *Chemistry of High–Temperature Superconductors II*, pp. 291–302, American Chemical Society, Washington, D.C. (1988).

*Primary Examiner*—Patrick J. Ryan
*Assistant Examiner*—Patrick R. Jewik
*Attorney, Agent, or Firm*—Pennie & Edmonds

[57] ABSTRACT

In a high-temperature superconductive conductor winding (1) comprising a tape-shaped high-temperature superconducting wire (2) which is combined with a metal 5 and wound into the form of a double pancake coil, the length of a throughout portion (5) provided between pancakes (4, 6) is at least four times the width of the tape-shaped high-temperature superconducting wire. Thus, it is possible to suppress generation of shearing stress at 10 the throughout portion (5), thereby preventing reduction of the critical current density caused by such shearing stress.

5 Claims, 3 Drawing Sheets

HIGH-TEMPERATURE SUPERCONDUCTIVE CONDUCTOR WINDING

This is a continuation-in-part of application Ser. No. 08/037,477, filed Mar. 24, 1993, now abandoned which in turn is a continuation of application Ser. No. 07/745,580, filed Aug. 15, 1991.

FIELD OF THE INVENTION

The present invention relates to a high-temperature superconductive conductor winding. More specifically, the present invention relates to improvement of properties, particularly the critical current property, of such a high-temperature superconductive conductor winding.

DESCRIPTION OF THE BACKGROUND ART

A high-temperature superconductive material, which is known as a ceramic superconductor, is coated with a metal and strongly worked into a thin tape by deformation processing. It has been recognized possible to attain a high critical current density by combining such deformation processing with heat treatment.

In order to apply such a tape-shaped high-temperature superconducting wire to a coil, for example, it is necessary to wind the wire, generally around a bobbin. In particular, such a tape shaped high-temperature superconducting wire is properly wound into the form of a double pancake coil. In such a double pancake coil, a single high-temperature wire is adapted to form two coil portions. Therefore, a throughout portion extending from one coil portion to the other coil portion is required. In relation to employment of the tape-shaped high-temperature superconducting wire, however, it has been recognized that the critical current density is reduced due to shearing stress which is applied to the throughout portion, since the wire is necessarily twisted at the throughout portion.

SUMMARY OF THE INVENTION

Accordingly, an object of the present invention is to provide a high-temperature superconductive conductor winding obtained by winding a tape-shaped high-temperature superconducting wire into the form of a double pancake coil, which can suppress generation of shearing stress in a throughout portion, thereby preventing reduction of the critical current density.

This object of the invention is achieved by means of a high-temperature superconductive conductor winding comprising a tape-shaped high-temperature superconducting wire being covered with a metal sheath and wound into the form of a double pancake coil having first and second pancakes and a throughout portion provided between said first and second pancakes. When the length (L) of said throughout portion is defined as $L=(W+D)/\sin\Theta$, where W represents width of the metal sheath, d represents distance between first and second pancakes, and $\Theta$ represents an angle formed by the center line at a central portion in longitudinal direction of the throughout portion and the center line of the wire in each pancake, then $\Theta$ is selected to be at most 30° and d is selected to be at least 0.1 mm and at most W, and the winding diameter of each pancake is selected to be at least 10 mm.

According to the present invention, the length of the throughout portion is selected to be at least four times the width of the tape-shaped high-temperature superconducting wire, whereby it is possible to suppress generation of shearing stress at the throughout portion, thereby preventing reduction of the critical current density caused by such shearing stress.

DESCRIPTION OF THE PREFERRED EMBODIMENTS

The present invention is directed to a high-temperature superconductive conductor winding obtained by winding a tape-shaped high-temperature superconducting wire, which is combined with a metal, into the form of a double pancake coil. According to the present invention, it is noted that the length of a throughout portion is deeply concerned with the aforementioned shearing stress, as well as the critical current density. The present invention is characterized in that the length of a throughout portion which is provided between pancakes is selected to be at least four times the width of the tape-shaped high-temperature superconducting wire, in order to solve the aforementioned technical problem.

A high-temperature superconductor contained in the high-temperature superconducting wire may be divided in a multifilament state. In the high-temperature superconductive conductor winding according to the present invention, the high-temperature superconducting wire may be covered with an insulating material of an inorganic substance such as mica, glass fiber or quartz fiber, or an organic substance such as tetrafluoroethylene, polyimide resin, or formal resin. The inventive high-temperature superconductive conductor winding is preferably impregnated with epoxy resin. More preferably, the epoxy resin contains fiber and/or powder. The tape-shaped high-temperature superconducting wire according to the present invention may comprise silver-sheathed bismuth cuprate oxide superconductor.

According to the present invention, the high-temperature superconducting wire is preferably provided with an insulating coat, so that the same can be directly wound into a coil with no specific insulating material. The high-temperature superconductor which is contained in the high-temperature superconducting wire is preferably divided in a multifilament state, so that the high-temperature superconductor is improved in strain resistance and can be wound with no problem after sintering. Further, the high-temperature superconductive conductor winding according to the present invention is preferably impregnated with epoxy resin, so that the winding is resistant against stress which may be applied thereto in preparation of such a winding or during excitation. More preferably, the epoxy resin contains fiber and/or powder, so that the winding is further resistant against the aforementioned stress.

The foregoing and other objects, features, aspects and advantages of the present invention will become more apparent from the following detailed description of the present invention when taken in conjunction with the accompanying drawings.

Figure 1:
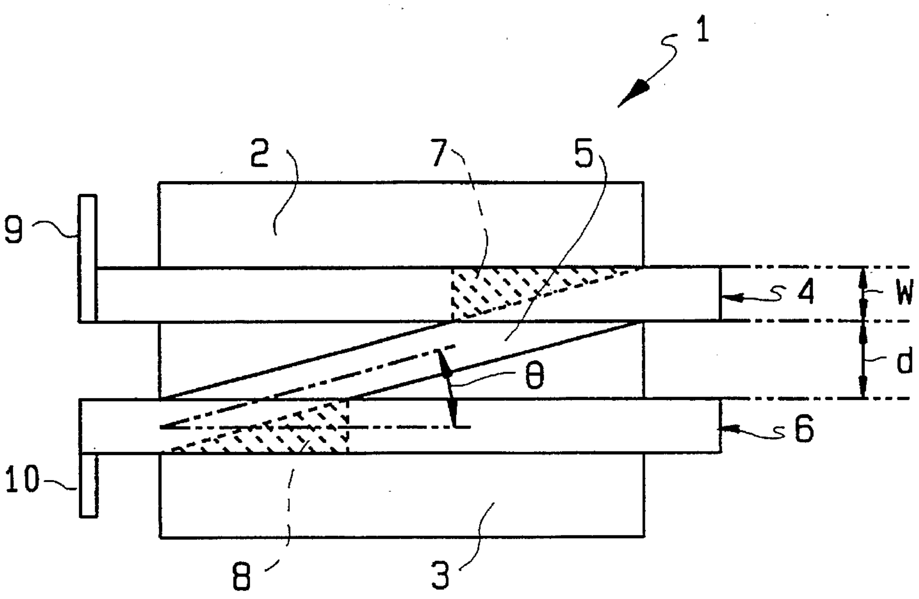
FIG. 1 is a front elevational view showing a high-temperature superconductive conductor winding 1 according to an embodiment of the present invention.
Figure 2:
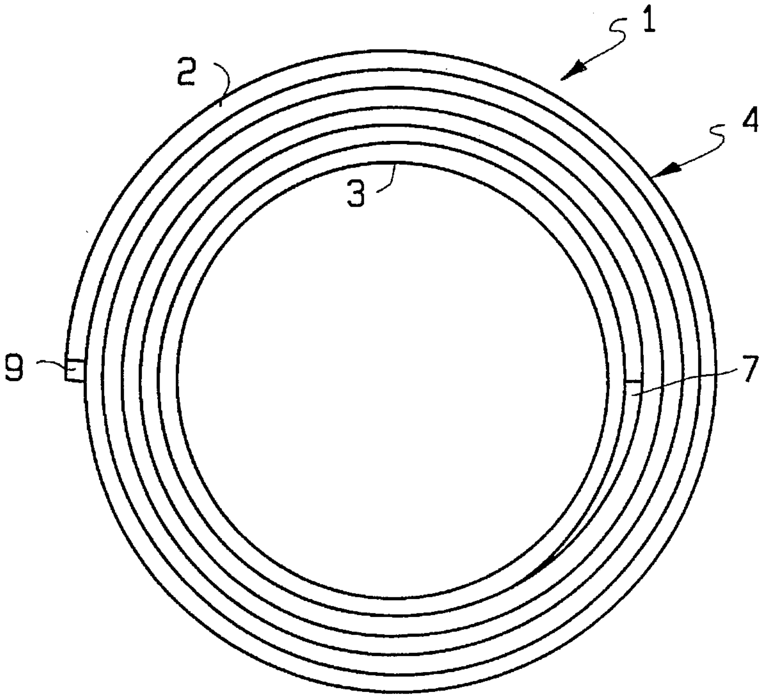
FIG. 2 is a top plan view of the high-temperature superconductive conductor winding 1 shown in FIG. 1.

FIGS. 1 and 2 illustrate a high-temperature superconductive conductor winding 1 according to an embodiment of the present invention. FIG. 1 is a front elevational view, and FIG. 2 is a top plan view.

This high-temperature superconductive conductor winding 1 is formed by winding a tape-shaped high-temperature superconducting wire 2, which is combined with a metal, on a cylindrical spool 3 into the form of a double pancake coil.

In more concrete terms, the single tape-shaped high-temperature superconducting wire 2 is wound on the spool 3 from its inner peripheral side to form an upper pancake, i.e., a first coil portion 4. A throughout portion 5, which is connected with the beginning end of the first coil portion 4, is guided to obliquely downwardly extend on the spool 3. The high-temperature superconducting wire 2 is then wound on the outer peripheral surface of the spool 3 from the inner peripheral side inversely to the first coil portion 4, thereby forming a lower pancake, i.e., a second coil portion 6.

In the aforementioned wound state of the tape-shaped high-temperature superconducting wire 2, clearances are defined along the first and second coil portions 4 and 6 due to formation of the throughout portion 5, while spacers 7 and 8 are inserted to absorb such clearances. In FIG. 1, reference character W represents width of the metal sheath, d represents distance between first and second pancakes, and Θ represents an angle formed by the center line at a central portion in longitudinal direction of the throughout portion and the center line of the wire in each pancake.

Current-carrying terminals 9 and 10 are mounted on both end portions of the wound high-temperature superconducting wire 2.

While the spool 3 is simply illustrated in a cylindrical configuration, flanges (not shown) are generally formed on both end portions thereof.

In this specification, the term "length of the throughout portion" indicates the length of the center line of the throughout portion 5, shown in FIG. 1, in a part exposed from the first and second coil portions 4 and 6.

EXAMPLES

Examples which were made to confirm the effect of the present invention are now described in detail.

Example 1

Oxides or carbonates containing Bi, Pb, Sr, Ca and Cu were so mixed that these elements were in composition ratios of 1.82:0.43:2.01:2.22:3.03, and this mixture was heat treated to prepare powder having a 2212 phase being composed of Bi, Pb, Sr, Ca and Cu substantially in the ratios of 2:2:1:2, and non-superconducting phases. This powder was degassed under a decompressed atmosphere of 2 Torr at 700° C. for 3 hours.

The as-formed powder was filled into silver pipes. 1296 such silver pipes were charged into a large silver pipe of 12 mm in outer diameter and 10 mm in inner diameter, which in turn was drawn into an outer diameter of 1 mm and then rolled into a thickness of 0.18 mm.

The as-formed tape-shaped wire was heat treated at 840° C. for 50 hours, and then rolled into a tape-shaped wire of 4 mm in width and 0.15 mm in thickness. This tape-shaped wire was then heat treated at 840° C. for 50 hours.

This tape-shaped wire was coated with a formal resin film of 0.1 mm in thickness and wound on a bobbin of 15 mm in outer diameter, to prepare a double pancake coil so that each pancake had ten turns. Between the first and second pancakes of the double pancake coil, an electrically insulating sheet having the thickness of 0.1 mm was interposed.

Figure 3:
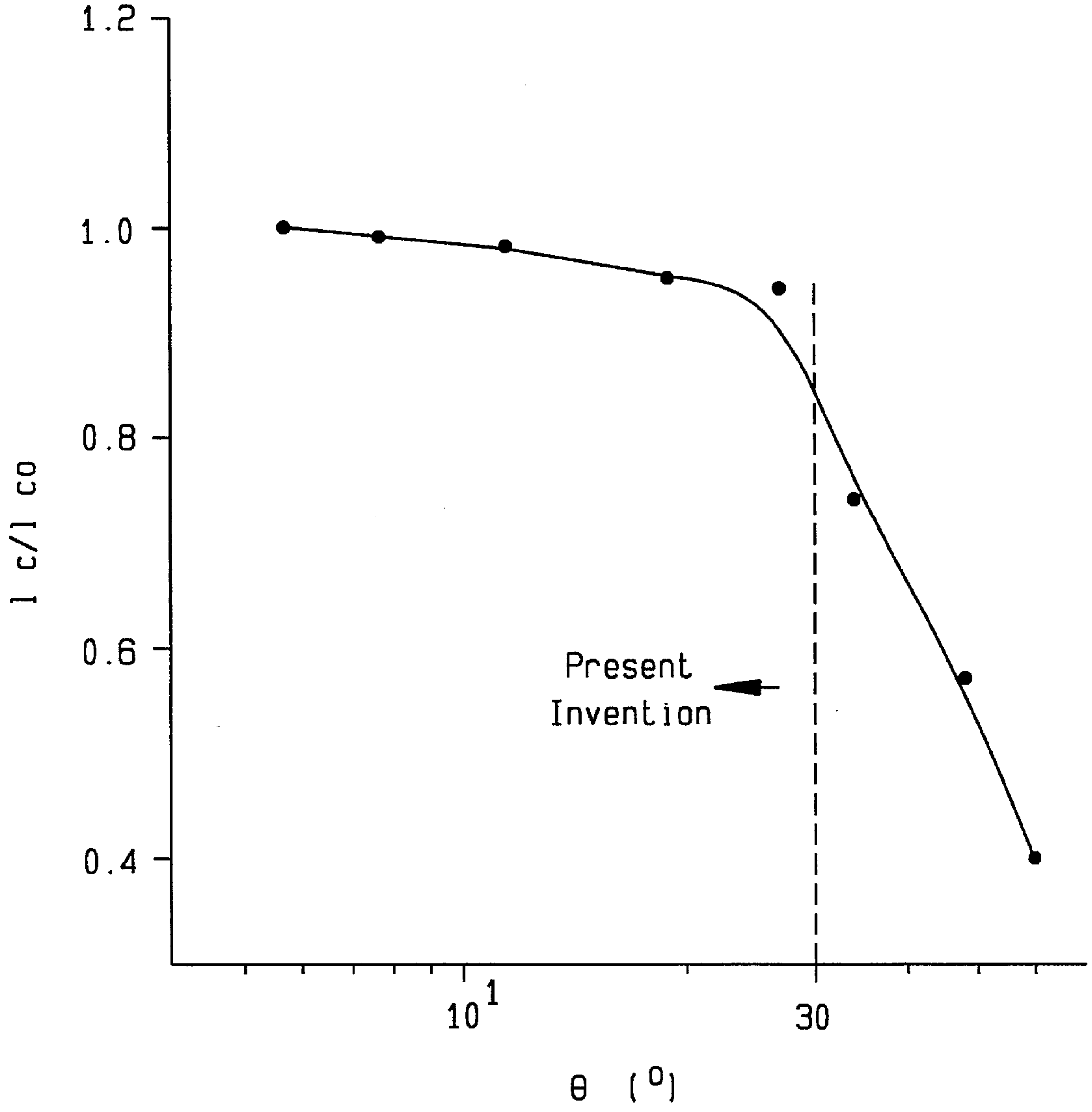
FIG. 3 is a plot of the ratio of critical current in the coil form to critical current of the wire itself across various throughout angles.

Some samples of such double pancake coils were prepared with the angle (Θ) of the throughout portion changed variously, with respective Ic/Ico (critical current in the coil form/critical current of the wire itself) was measured. The results are as shown in FIG. 3. It can be seen from FIG. # that Ic/Ico decreases significantly when Θ exceeds 30° .

Example 2

Figure 4:
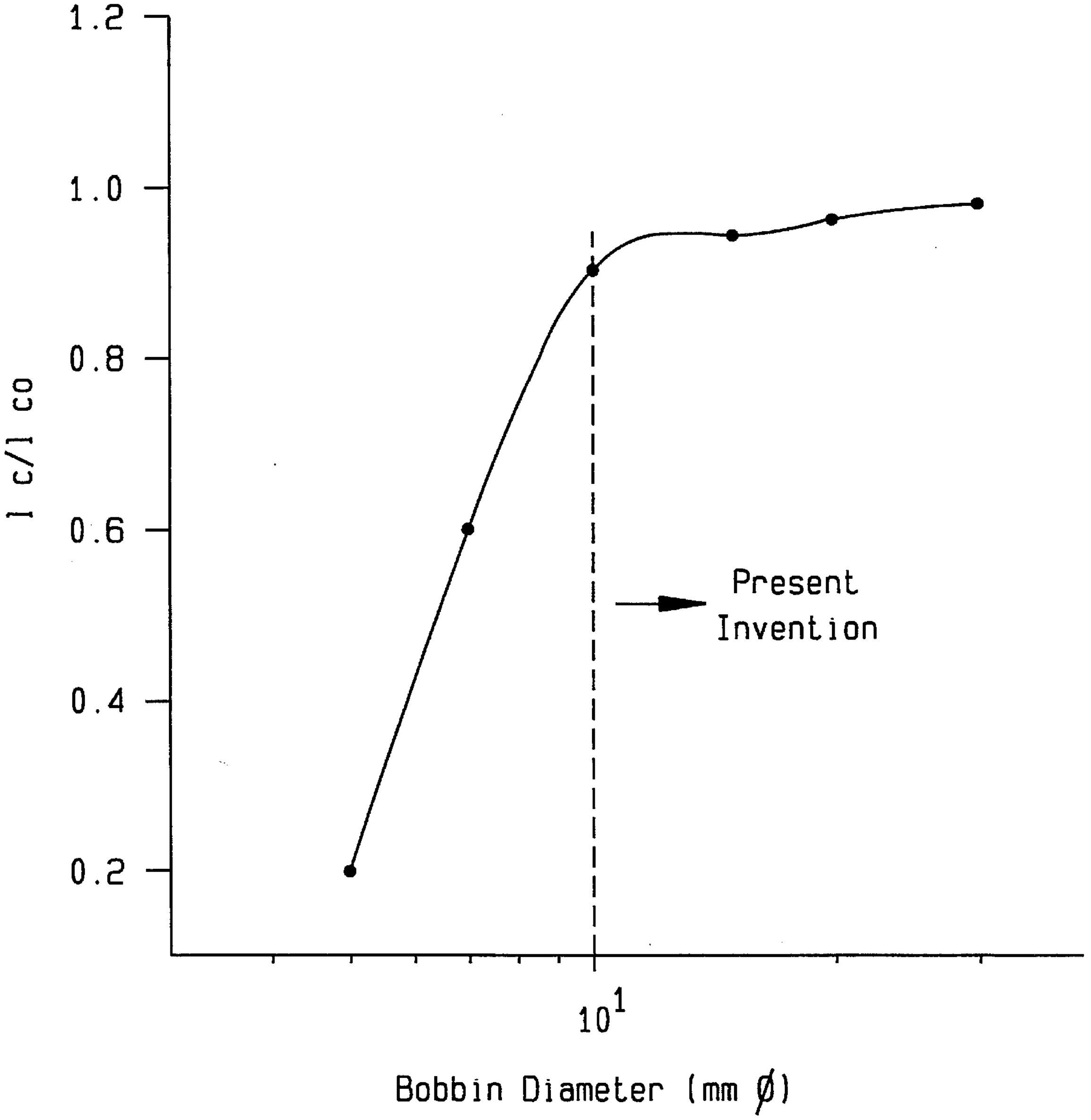
FIG. 4 is a plot of the ratio of critical current in the coil form to critical current of the wire itself across various bobbin diameters.

Some samples of double pancake coils were prepared in the similar manner as in Example 1, except that the angle (Θ) of the throughout portion was fixed at 27°, while variously changing bobbin diameter used. The results of measurement of respective Ic/Ico are as shown in FIG. 4. It can be seen from FIG. 4 that Ic/Ico degrades significantly when the bobbin diameter is smaller than 10 mm.

Now, when the distance (d) between the pancakes exceeds the width (W) of the metal sheath of tape-shaped wire, the ratio of occupation of the wire in the double pancake coil (coil packing factor) becomes too small and current density flowing through the coil becomes too low, so that high magnetic field performance, which is the feature of the super conducting coil, cannot be exhibited.

Although the present invention has been described and illustrated in detail, it is clearly understood that the same is by way of illustration and example only and is not to be taken by way of limitation, the scope of the present invention being limited only by the terms of the appended claims.

What is claimed is:

1. A high-temperature superconductive conductor winding comprising a tape-shaped high-temperature superconducting wire that comprises silver-sheathed bismuth cuprate oxide superconductor, said wire being covered with a metal sheath and wound into the form of a double pancake coil having first and second pancakes and a throughout portion provided between said first and second pancakes, wherein Θ is selected to be at most 30° and d is selected to be at least 0.1 mm and at most W, and winding diameter of each pancake is selected to be at least 10 mm, when the length (L) of said throughout portion is defined as $L=(W+D)/\sin\Theta$, where W represents width of the metal sheath, d represents distance between first and second pancakes, and Θ represents an angle formed by the center line at a central portion in longitudinal direction of the throughout portion and the center line of the wire in each pancake.

2. The high-temperature superconductive conductor winding of claim 1 wound about a bobbin having a diameter of at least 10 mm.

3. The high-temperature superconductive conductor winding of claim 1, wherein $L \geqq 4$ W.

4. The high-temperature superconductive conductor winding of claim 3, wherein W is approximately 4 mm and wherein L ranges from 15 to 30 mm.

5. The high-temperature superconductive conductor winding of claim 1, wherein said wire is coated with a thermally insulating film selected from the group consisting of formal resin and polyimide resin.

* * * * *